(12) United States Patent
Wolf et al.

(10) Patent No.: US 8,741,122 B2
(45) Date of Patent: Jun. 3, 2014

(54) PROCESS FOR THE REDUCTION OF OXYGEN

(75) Inventors: Aurel Wolf, Wülfrath (DE); Volker Michele, Köln (DE); Leslaw Mleczko, Dormagen (DE); Jens Assmann, Hilden (DE)

(73) Assignee: Bayer Intellectual Property GmbH, Monheim (DE)

( * ) Notice: Subject to any disclaimer, the term of this patent is extended or adjusted under 35 U.S.C. 154(b) by 529 days.

(21) Appl. No.: 12/922,992

(22) PCT Filed: Mar. 19, 2009

(86) PCT No.: PCT/EP2009/002028
§ 371 (c)(1),
(2), (4) Date: Sep. 16, 2010

(87) PCT Pub. No.: WO2009/118124
PCT Pub. Date: Oct. 1, 2009

(65) Prior Publication Data
US 2011/0042231 A1    Feb. 24, 2011

(30) Foreign Application Priority Data
Mar. 27, 2008    (DE) .......................... 10 2008 015 902

(51) Int. Cl.
*C25B 1/26*    (2006.01)
*B82Y 99/00*    (2011.01)

(52) U.S. Cl.
USPC ......................................... 205/620; 977/749

(58) Field of Classification Search
USPC ............................................ 205/620; 977/749
See application file for complete search history.

(56) References Cited

U.S. PATENT DOCUMENTS

| 6,149,782 | A | 11/2000 | Allen et al. |
| 6,368,490 | B1 * | 4/2002 | Gestermann .................. 205/620 |
| 7,074,306 | B2 | 7/2006 | Martelli et al. |
| 2006/0249380 | A1 | 11/2006 | Gestermann et al. |
| 2007/0275160 | A1 | 11/2007 | Maldonado et al. |

FOREIGN PATENT DOCUMENTS

WO    WO 2007070047 A2 *    6/2007

OTHER PUBLICATIONS

Matter et al., "Non-Metal Catalysts for Dioxygen reduction in an Acidic Electrolyte", Dept. of Chemical Engineering, The Ohio State University, Catalysis Letters, vol. 109, Nos. 3-4, p. 115-123, Jul. 2006.
Zhang, "A Nitrogen Functionalized Carbon Nanotube Cathode for Highly Efficient Electrocatalytic Generation of H2O2 in Electro-Fenton System", Separation and Purification Technology, vol. 64, p. 116-123, (2008).

* cited by examiner

*Primary Examiner* — Nicholas A Smith
(74) *Attorney, Agent, or Firm* — Norris McLaughlin & Marcus PA

(57) ABSTRACT

Process for the reduction of oxygen in aqueous chlorine- and/or chloride-containing solutions in the presence of a catalyst comprising nitrogen-doped carbon nanotubes.

12 Claims, 2 Drawing Sheets

PROCESS FOR THE REDUCTION OF OXYGEN

This is a 371 of PCT/EP2009/002028 filed 19 Mar. 2009 (international filing date), claiming priority of German application 10 2008 015 902.6 filed 27 Mar. 2008.

BACKGROUND OF THE INVENTION

The invention relates to a process for the reduction of oxygen in aqueous chlorine- and/or chloride-containing solutions in the presence of a catalyst comprising nitrogen-doped carbon nanotubes.

Considerable quantities of aqueous hydrogen chloride solutions are obtained in the chemical industry. This applies particularly in the production of aromatic and aliphatic isocyanates. The recycling of chlorine from the solutions containing hydrogen chloride is usually carried out industrially by means of a hydrogen chloride electrolysis. These hydrogen chloride electrolyses involve the reduction of oxygen on the cathode side.

To reduce the overvoltages or cell potentials needed for the reduction of oxygen, use is frequently made of catalysts for the reduction of oxygen, This is intended, in particular, to reduce the energy costs of the process. In many cases, catalysts comprise noble metals or compounds comprising noble metals, e.g. platinum and compounds comprising platinum, so that the processes are generally very costly.

U.S. Pat. No. 6,149,782 discloses a catalyst comprising rhodium sulphide ($RhS_x$) as essentially catalytically active component by means of which oxygen can be reduced in aqueous, chlorine-containing solutions. Furthermore, U.S. Pat. No. 6,149,782 discloses that the use of rhodium sulphide is advantageous because the change from pure noble metals (in particular platinum) results, inter alia, in dissolution of the catalytically active component of the catalyst occurring only to a greatly reduced extent. It is explained that some contact of the chlorine- and/or chloride-containing solution with the catalytically active component of the catalyst cannot be prevented and the contact is therefore the cause of this leaching as a result of complexes and/or salts of the metals of the catalytically active component being formed and leached from the catalyst. A disadvantage of the catalyst according to U.S. Pat. No. 6,149,782 is that rhodium is a rare and thus expensive material, so that essentially the same economic disadvantages as in the case of platinum or other noble metals and their compounds stand in the way of use of the catalysts disclosed. In addition, leaching of the catalytically active component rhodium sulphide can likewise not be prevented entirely since rhodium and its compounds also form stable salts and/or complexes with chlorine and these are leached to a small extent from the catalyst, so that the latter becomes depleted in catalytically active material and is deactivated as a result. In a process based on this catalyst, the deactivated catalyst would therefore have to be replaced at regular intervals, so that the abovementioned disadvantages of rhodium make the process economically unattractive.

U.S. Pat. No. 7,074,306 discloses that catalysts based on rhodium sulphide have a further technical disadvantage in that at high current densities they catalyze the formation of hydrogen, which leads to safety problems in the operation of processes utilizing such catalysts. It is therefore disclosed that this disadvantage can be alleviated by the use of platinum together with rhodium sulphide. In this way, according to the disclosure, the accumulation of hydrogen in the $O_2$ gas stream is prevented even at high current densities.

However, a process using such catalysts/catalytically active components is just as economically disadvantageous as that mentioned above, since the combination of rhodium and platinum combines the economic disadvantages of the two.

It is also stated that the ability of the catalyst to reduce the cell voltage or the overvoltage for the reduction of oxygen is decreased solely by changing the solution from a solution containing sulphuric acid to a solution containing hydrochloric acid. An improvement in the maximum possible periods of operation of the process without the necessity of changing the catalyst material as a result of the addition of platinum is not disclosed.

US 2006/0249380 discloses further suitable catalytically active components which can be employed in catalysts for the reduction of oxygen in aqueous chlorine- and/or chloride-containing solution. Apart from the abovementioned noble metals, rhodium and platinum, the document also discloses iridium, rhenium, ruthenium and palladium, their sulphides and oxides and also mixed phases, in particular ones containing molybdenum and/or selenium, as possible catalytically active components. A material combination whose catalytic effect is not based on noble or transition metals is not disclosed. It is likewise taught that it is advantageous not to bring any hydrochloric acid into contact with the catalyst since corrosive attack on the catalytically active components disclosed is prevented in this way. Ideally, contact of chlorides and/or chlorine with the catalytically active component should be prevented entirely.

In the light of the disadvantages of the prior art, it is therefore an object of the invention to provide a process for the reduction of oxygen in aqueous chlorine- and/or chloride-containing solutions, which dispenses with the use of expensive noble and/or transition metals as essential catalytically active component, which has no tendency to form hydrogen and does not necessitate replacement of the catalytically active component due to its consumption or deactivation and reduces the cell potential necessary to a value comparable to that in a process in which no aqueous chlorine- and/or chloride-containing solutions are present.

SUMMARY OF THE INVENTION

It has surprisingly been found that a process for the reduction of oxygen which is characterized in that in aqueous chlorine- and/or chloride-containing solutions the oxygen of at least one oxygen-comprising component is reduced in the presence of a catalyst by application of an electric potential, with the catalyst comprising a proportion of nitrogen-doped carbon nanotubes as catalytically active component, is able to achieve this object.

DETAILED DESCRIPTION

In the context of the present invention, the expression aqueous chlorine- and/or chloride-containing solutions refers to all solutions whose solvent is water and which comprise molecular chlorine in dissolved or gaseous form and/or chloride, hypochlorite and/or chlorate and/or perchlorate ions. Nonlimiting examples are aqueous solutions of salts which comprise chloride ions, hypochlorite and/or chlorate and/or perchlorate ions, e.g. NaCl, NaOCl, $MgCl_2$, etc. with molecular chlorine dissolved therein or in gaseous form and also acids which are soluble in water or miscible therewith, e.g. $H_2SO_4$, HCl with molecular chlorine dissolved therein or in gaseous form. Preference is given to aqueous solutions of HCl with molecular chlorine dissolved therein or in gaseous form.

Particular preference is given to aqueous solutions of HCl with molecular chlorine dissolved therein.

If the aqueous chlorine- and/or chloride-containing solution is an aqueous solution of HCl, the concentration is usually 0.1-37% by weight of HCl, preferably 0.5-37% by weight of HCl.

The chlorine- and/or chloride-containing solutions according to the invention can also comprise traces of impurities without the ability to carry out the process of the invention being hindered thereby.

In the context of the present invention, traces are concentrations of less than 1000 ppm. Possible impurities are, for example, organic impurities such as alcohols which are miscible with water in the indicated concentration or are soluble in water. Nonlimiting examples are methanol, ethanol, 1-propanol, 2-propanol, 1,2-propanediol, etc.

In the context of the present invention, oxygen-comprising components are all substances which comprise oxygen, with the oxygen being present in an oxidation state greater than −2 in the component. Nonlimiting examples are molecular oxygen and hydrogen peroxide. The oxygen-comprising component can be present in solution in the aqueous solution or be in gaseous form. The oxygen-comprising component is preferably molecular oxygen. The oxygen-comprising component is particularly preferably molecular oxygen present in solution in the aqueous solution.

In the context of the present invention, the term catalyst refers to all substances or mixtures which comprise at least one catalytically active component and which reduce the cell potential of a half cell comprising the electrochemical equilibrium as per formula (I):

$$O^X + Y \cdot e^- \leftrightarrow O^{X-Y}, \quad (I)$$

where $X > -2$ and $0 < Y < 3$.

The catalysts used in the process of the invention are characterized by a proportion of nitrogen-doped carbon nanotubes as catalytically active component.

The proportion of nitrogen-doped carbon nanotubes in the catalyst without a polymeric binder which may be present is usually at least 30% by weight. Preference is given to a proportion of at least 50% by weight.

In the context of the present invention, nitrogen-doped carbon nanotubes are carbon nanotubes which are known in their general form to those skilled in the art and are characterized by a proportion of nitrogen as constituent of the molecular structure of the carbon nanotubes. Processes by means of which these can be obtained may be found, for example, in the German Patent Application number DE 10 2007 062421.4 (corresponding to U.S. Ser. No. 12/743,721) or in Paul H. Matter, Ling Zhang, Limit S. Ozkan, " The role of nanostructure in nitrogen-containing carbon catalysts for the oxygen reduction reaction" Journal of Catalysis 239 (2006) 83-96.

The nitrogen-doped carbon nanotubes used in the process of the invention are usually carbon nanotubes which comprise a proportion of at least 0.5% by weight of nitrogen. The nitrogen-doped carbon nanotubes preferably comprise at least 1% by weight of nitrogen, particularly preferably at least 2% by weight of nitrogen.

The nitrogen present in the nitrogen-doped carbon nanotubes used according to the invention is built into the graphitic layers and is preferably present as pyridine nitrogen and/or as quaternary nitrogen and/or as nitroso nitrogen and/or as nitro nitrogen. The nitrogen is preferably present as pyridine nitrogen and/or as quaternary nitrogen.

A proportion of nitrogen which is too low leads to the electric potential to be applied becoming greater, as a result of which operation of the process requires more electric power. More power is in turn economically disadvantageous.

The nitrogen-doped carbon nanotubes used as catalytically active component of the catalyst in the process of the invention are preferably nitrogen-doped carbon nanotubes as are obtained according to the German Patent Application number DE 10 2007 062421.4 (corresponding to U.S. Ser. No. 12/743,721).

The use of catalysts comprising nitrogen-doped carbon nanotubes as catalytically active component in the process of the invention is particularly advantageous because the presence of chlorine and/or chloride ions surprisingly does not, in contrast to the prevailing opinion in the prior art (e.g. US 2006/0249380), result in a reduction in the activity and thus not in a reduction in the oxygen reduction rate at a constant applied electric potential. Furthermore, it has surprisingly been found that the nitrogen-doped carbon nanotubes are not leached out in chlorine- and/or chloride-containing aqueous solutions during the course of the process. The process of the invention can thus also be operated for a long period with a constantly high reduction in the required overvoltage by the nitrogen-doped carbon nanotubes. Replacement of the catalytically active component is thus not necessary or necessary only after a very much longer time in the process of the invention. Finally, the process of the invention is economically advantageous just because the use of expensive noble metals (e.g. platinum or rhodium) can be dispensed with in favour of catalytically active components based on modifications of carbon.

The catalysts used in the process of the invention can comprise not only nitrogen-doped carbon nanotubes but also catalytically active components and/or polymeric binders and/or fillers such as carbon black which are generally known to those skilled in the art.

In an alternative embodiment, the catalyst used in the process of the invention comprises other catalytically active components which are generally known to those skilled in the art, e.g. rhodium sulphide or platinum, in addition to the nitrogen-doped carbon nanotubes.

The use of other catalytically active components which are generally known to those skilled in the art is advantageous because in zones of the catalyst in which only a small amount of chlorine is to be expected these can ensure a further catalytic conversion without the advantages in respect of the periods of operation of the process of the invention being given up.

The catalyst used in the process of the invention preferably comprises a polymeric binder, particularly preferably a polymeric binder and fillers, in addition to the nitrogen-doped carbon nanotubes.

Polymeric binders are preferably sulphonated tetrafluoroethylene polymers (PTFE). Particular preference is given to sulphonated tetrafluoroethylene polymers which are marketed under the name Nafion® by DuPont.

Fillers are materials which display little or no catalytic activity in the reaction according to formula (I). Examples of suitable fillers are carbon black and graphite.

The use of fillers and a polymeric binder is advantageous because the catalytically active component in the process of the invention (viz. the nitrogen-doped carbon nanotubes or other catalytically active components known to those skilled in the art) is then present in a form which is easy to handle or can be fixed in one place by means of the polymeric binder and in addition the hydrophobicity of the catalyst can be controlled.

The process of the invention is usually carried out at a temperature of 0-200° C., preferably 30-150° C. and particularly preferably 40-95° C.

It is generally known to those skilled in the art that pressure and temperature are related to one another, particularly in the case of substances which are present in the gas phase. At the temperatures indicated above, the process of the invention is usually carried out in a pressure range from 1 to 20 bar, preferably from 1 to 5.5 bar.

The elevated temperatures for operation of the process are particularly advantageous because the reduction of oxygen can be accelerated further in this way. In addition, it has surprisingly been found that the process of the invention displays constantly high rates of reduction of oxygen even at temperatures above 60° C., while processes according to the prior art using catalytically active components which contain noble metals or are based on rhodium sulphide display a significantly faster loss of the catalytically active component from the catalyst at higher temperatures since the solubility of chloride salts or chlorine complexes of the catalytically active component in the aqueous solution is also increased.

The elevated pressure is advantageous because under elevated pressures the solubility of oxygen in the aqueous solution is increased at the elevated temperatures and outgassing can be prevented.

In the context of the present invention, application of an electric potential refers to contacting of the catalyst with an electric conductor and connection of the resulting electrode to a counterelectrode via a source of an electric potential. The electric potential is, for the present purposes, the potential of a half cell comprising the contacted catalyst in a chlorine- and/or chloride-containing aqueous solution relative to a standard hydrogen electrode as reference electrode. The standard hydrogen electrode merely forms a reference point for making clear the properties of the process of the invention in respect of the reduction of oxygen in the presence of a catalyst with application of an electric potential. The calculation of the required overvoltage for the reduction of oxygen from the measured electric potential (electrode potential) relative to a standard hydrogen electrode is generally known to those skilled in the art.

As a result of the electric potential applied in the process of the invention, current flows between the contacted catalyst and the counterelectrode as a result of the transfer of electrons according to formula (I) to the oxygen to be reduced.

In the context of the present invention, the current is normalized relative to the geometric area of the catalyst which is in contact with the aqueous chlorine- and/or chloride-containing solution and referred to as current density expressed in $kA/m^2$.

The current density in the process of the invention is usually greater than $0.01\ kA/m^2$, preferably in the range from $0.1\ kA/m^2$ to $20\ kA/m^2$, particularly preferably from $1\ kA/m^2$ to $10\ kA/m^2$.

The electric potential applied and the current density are related according to laws which are generally known to those skilled in the art, so that the power which has to be introduced into the process for the reduction of oxygen is linearly dependent on both parameters.

However, the reduction of oxygen is, above a minimum necessary potential, only dependent on the number of electrons to be transferred to oxygen, i.e. on the current which flows and thus on the current density. The electric potential which has to be applied in the process in order to achieve reduction of oxygen is comparable to that which has to be applied in the processes according to the prior art. However, it is surprisingly found that the current densities according to the invention and the preferred current densities can be higher without formation of hydrogen having to be feared at the same potential. Thus, the process of the invention can be operated more safely and more economically. The upper limits to the current densities in the preferred embodiments of the process of the invention impose limits in terms of apparatus in carrying out the process since the outlay in terms of apparatus for producing the high current densities increases greatly and the capital costs of apparatuses for carrying out the process of the invention thus likewise increase. The process itself has no upper limit in respect of the current densities which can be used.

The current densities according to the invention and the preferred current densities usually give overvoltages at the catalyst for the reduction of oxygen of less than 0.8 V.

As a result of these low overvoltages necessary in the process of the invention, only a small power input is necessary at high current and, correlated therewith, high conversion according to formula (I). This is in turn economically advantageous and also does not lead to an excessive temperature increase in the vicinity of the catalyst as a result of this power input.

A preferred further development of the process of the invention is characterized in that the aqueous chlorine- and/or chloride-containing solution is formed over the catalyst by passing a gas stream comprising molecular oxygen and gaseous HCl and also, if appropriate, water vapour over the catalyst.

When the two abovementioned gas streams are passed over the catalyst, the molecular oxygen is, according to the invention, reduced to two $O^{2-}$ ions and with the dissociated $H^+$ ions of the HCl gas forms water over the catalytically active component.

The further development is advantageous because the reaction is in this way no longer influenced by the necessity of diffusion of oxygen through the aqueous solution to the catalytically active component of the catalyst. In general, diffusion rates in solutions are lower than in the gas phase. The oxygen reduction rate can thus be increased and the process can be made more economical by automatic formation of only a thin aqueous film on the surface of the catalyst. Furthermore, the energy-intensive operation of pump facilities for the supply and discharge of aqueous solutions is no longer necessary in the case of the preferred further development. It is only necessary to transport the gaseous starting materials of the process to the catalyst but not the water which is inert in the reduction of oxygen.

The process of the invention is preferably carried out as part of overall processes for the production of chlorine, so that these processes are then characterized in that in aqueous chlorine- and/or chloride-containing solutions the oxygen of at least one oxygen-comprising component is reduced in the presence of a catalyst by application of an electric potential in a first reaction zone, with the catalyst comprising a proportion of nitrogen-doped carbon nanotubes as catalytically active component, and chloride is oxidized to chlorine in a second reaction zone.

The process of the invention is illustrated below with the aid of examples, without the subject matter of the invention being restricted thereto.

EXAMPLES

Example 1

Electric Potential and Current Densities Necessary for the Reduction of Oxygen—Process of the Invention A catalyst was obtained by firstly dispersing 40 mg of nitrogen-doped carbon nanotubes produced by the process of Example 5 of the German Patent Application number DE 10 2007 062421.4 in 50 ml of acetone and dropping 120 μA onto the polished electrode surface of a rotating annular disc electrode (from Jaissle Elektronik GmbH). After evaporation of the acetone, 10 μl of a dissolved sulphonated tetrafluoroethylene polymer (Nafion® solution; from DuPont) in a concentration of 26 mg/ml in isopropanol was dropped onto this to fix the catalyst.

The rotating annular disc electrode comprising the nitrogen-doped carbon nanotubes was used as working electrode in a laboratory cell containing 3 electrodes (working electrode, counterelectrode and reference electrode). The set-up used is generally known to those skilled in the art as a three-electrode arrangement. As electrolyte, use was made of a 5% strength by weight hydrochloric acid solution in water which had been saturated with oxygen beforehand. An Ag/AgCl electrode was used as reference electrode. The values obtained were subsequently expressed relative to the potential of a standard hydrogen electrode (SHE) for better comparability. The electrolyte was heated to 55° C. and the measurements were carried out at this temperature. Scans were carried out from +0.8 to 0.0 V relative to the standard hydrogen electrode (SHE) at 10 mV/s in oxygen-saturated hydrochloric acid solution. At a rotation rate of the annular disc electrode of 3600 min$^{-1}$ and an operating temperature of 55° C., there is surprisingly no step increase in the current density, which would be characteristic of the formation of hydrogen, in the abovementioned measurement range after the limiting current density for the reduction of oxygen has been reached (cf. FIG. 1, line A).

Example 2

Electric Potential and Current Densities Necessary for the Reduction of Oxygen—Comparison with Carbon Black (Vulcan XC72)

A comparative experiment was carried out using a method analogous to Example 1 with the sole difference that carbon black (Vulcan XC72, from Cabot) was used in place of nitrogen-doped carbon nanotubes.

Figure 1:
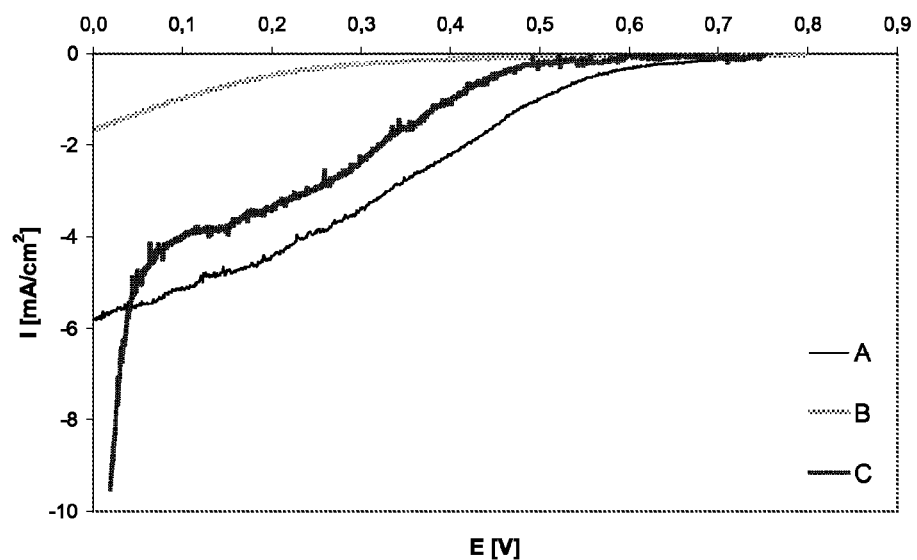
FIG. 1 shows the change in the current density (I) as a function of the electrode potential (E) of the rotating annular disc electrode relative to a standard hydrogen electrode for the process of the invention (A), as per Example 1, when carbon black is used (B), as per Example 2, and for the use of iridium catalyst (C), as per Example 3.

It was found that the current density displayed no step increase which would have been characteristic of the formation of hydrogen but the current densities were lower than in the case of the measurement in Example 1 (cf. FIG. 1, line B). In the process used, lower current densities at the same applied potential indicate decreased reduction of oxygen.

Example 3

Electric Potential and Current Densities Necessary for the Reduction of Oxygen—Comparison with an Iridium Catalyst Supported on Vulcan XC72

A comparative experiment was carried out using a method analogous to Example 1 with the sole difference that an iridium catalyst supported on Vulcan XC72 was used in place of nitrogen-doped carbon nanotubes. The iridium catalyst (20% by weight of Ir) was produced from an aqueous suspension of Vulcan XC72 (from Cabot) in an aqueous solution of $IrCl_3$ (from Fluka) by precipitation with $H_2S$ in a basic medium (pH≈10). The solid which was separated off was calcined at 700° C. in a stream of $N_2$ gas for 2 hours.

It was found that the current density displays a step increase characteristic of the formation of hydrogen at an electrode potential of from 0 V to 0.08 V relative to the SHE. At the same time, the current densities in the range in which no formation of hydrogen has to be feared are lower than in the case of the measurement in Example 1 (cf. FIG. 1, line C).

A summary of the current densities at an electrode potential of 0.4 V (from FIG. 1) in Examples 1 to 3 together with the observation as to whether hydrogen is produced in the process is shown in Table 1 below.

TABLE 1

Summary of the current densities and tendency for hydrogen to be formed

| | Current density at an electrode potential of 0.4 V [mA/cm$^2$] | Hydrogen formation [—] |
|---|---|---|
| Example 1 | −2.2 | no |
| Example 2 (comparative example) | −0.125 | no |
| Example 3 (comparative example) | −1.03 | yes |

Example 4

Influence of Chloride on the Reduction of Oxygen—Process of the Invention

Experiments analogous to that in Example 1 were carried out with the aqueous solution being 1 molar hydrochloric acid solution in a first set of experiments and a 0.5 molar sulphuric acid solution in a second set of experiments. Further changes in the experimental set-up compared to that in Example 1 were not undertaken.

Figure 2:
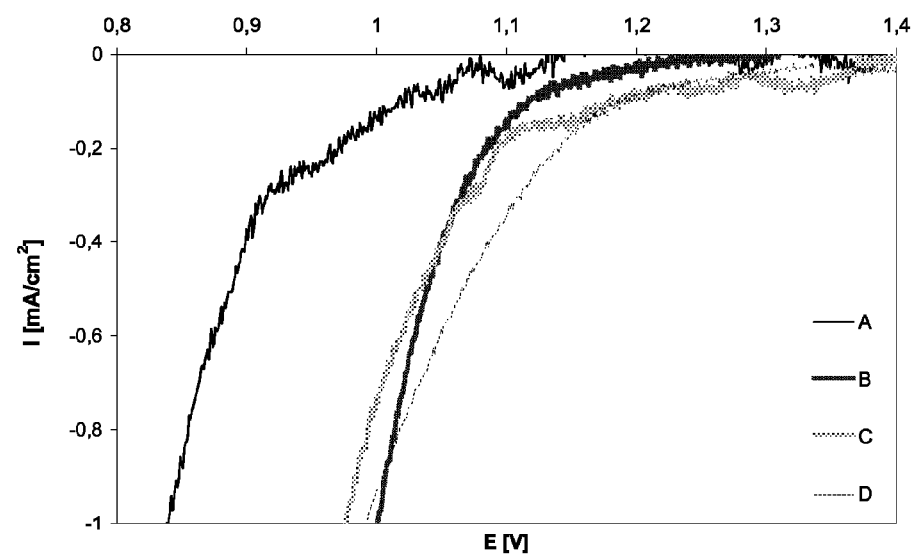
FIG. 2 shows the change in the current density (I) as a function of the electrode potential (E) of the rotating annular disc electrode, normalized to measurements in $H_2SO_4$ at 1 mA/cm$^2$ and at E=1 V; for catalyst comprising noble metal in HCl solution (A), for catalyst comprising noble metal in $H_2SO_4$ solution (B), for catalyst according to the invention in HCl solution (C) and for catalyst according to the invention in $H_2SO_4$ (D).
Figure 3:
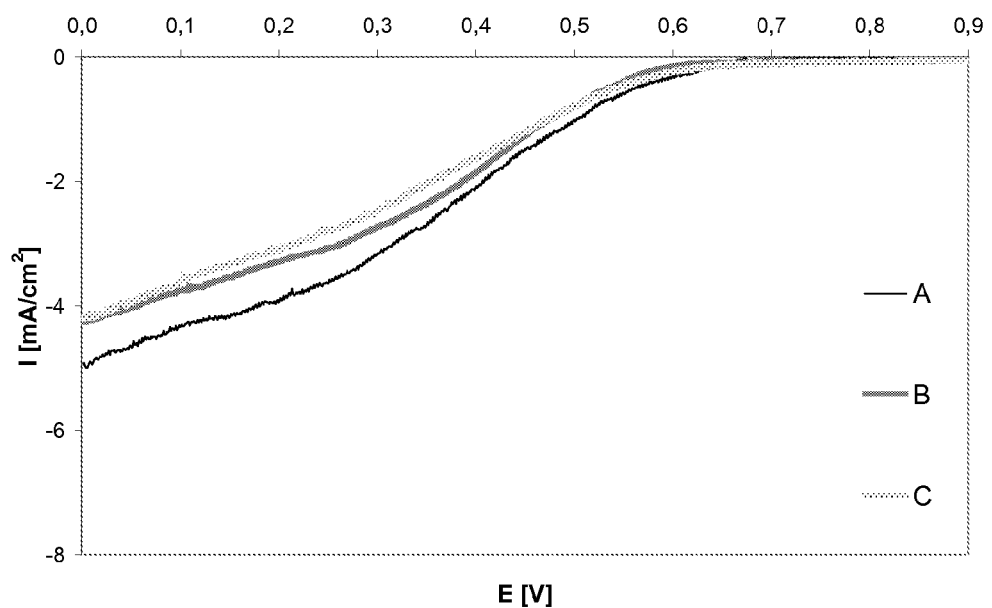
FIG. 3 shows the change in the current density (I) as a function of electrode potential (E) of the rotating annular disc electrode relative to a standard hydrogen electrode for the process of the invention as per Example 1, with prior treatment with boiling hydrochloric acid solution as per Example 6, after treatment for one hour (A), three hours (B) and five hours (C).

It was found that the process of the invention surprisingly had almost the same oxygen reduction capability in the presence of chloride ions in the aqueous solution as in a medium containing sulphuric acid since the two curves for the two electrolytes were almost identical (cf. FIG. 2, lines C, D; the results of the measurements in sulphuric acid solutions were, to give a clearer picture, normalized to 1 mA/cm$^2$ at 1 V and the results of the measurements in hydrochloric acid solutions were shown relative thereto).

Example 5

Influence of Chloride on the Reduction of Oxygen—Comparison with Catalyst Comprising Noble Metal Experiments analogous to those in Example 4 were carried out using a rhodium sulphide catalyst produced by the method disclosed in U.S. Pat. No. 6,149,782 as catalyst.

It was found that the process carried out in this way in chloride-containing aqueous solutions displayed a significantly reduced oxygen reduction capability (cf. FIG. 2, lines A, B). It may be pointed out that the depiction of FIG. 2 does not allow any comparison of the courses of the experiments of Example 4 with those of this example because of the normalization. However, relative ratios within each example can be made and are permissible for experiments carried out therein.

The nitrogen-doped carbon nanotubes have thus surprisingly been found to be very tolerant to chloride ions (Ex. 4; compared to lines C, D of FIG. 2). Poisoning of the catalyst by the chloride ions and thus a significant decrease in the oxygen reduction capability was found only for a process involving a rhodium sulphide catalyst.

Example 6

Stable Operating Times of the Process of the Invention

To simulate a particularly long operating time of the process, the coating of the annular disc electrode was treated for various times in 37% strength by weight aqueous hydrochloric acid solution under reflux at about 100° C. before an experiment to measure the overvoltage as per Example 1. The treatment was carried out for one hour, three hours and five hours.

The curves for three and five hours show no significant difference between one another. A slight decrease in the current density could be observed when the treatment under reflux was carried out not for one hour but for three hours.

It was thus evident that the process of the invention can be carried out even after long, simulated operating times under disadvantageous conditions without significant deterioration in the oxygen reduction capability and without the necessity of replacing the catalyst material.

A loss of the nitrogen in the catalytically active component could not be detected even under high stresses since nitrogen-doped carbon nanotubes always still contained over 98% of the nitrogen originally detected before the treatment even after a treatment time of five hours in 37% strength by weight aqueous hydrochloric acid solution under reflux at about 100° C. (determined by means of elemental analysis; Leco®TruSpec instrument; method as indicated by the manufacturer).

The invention claimed is:

1. Process for the reduction of oxygen, wherein, oxygen dissolved in aqueous chlorine- and/or chloride-containing solutions is reduced in the presence of a catalyst by application of an electric potential, with the catalyst comprising a proportion of nitrogen-doped carbon nanotubes as catalytically active component.

2. Process according to claim 1, wherein the aqueous chlorine- and/or chloride-containing solutions are solutions of HCl with molecular chlorine dissolved therein or in gaseous form.

3. Process according to claim 1, wherein the catalyst without a polymeric binder which optionally may be present comprises a proportion of at least 30% by weight of nitrogen-doped carbon nanotubes.

4. Process according to claim 1, wherein that the nitrogen-doped carbon nanotubes comprise a proportion of at least 0.5% by weight of nitrogen.

5. Process according to claim 1, wherein the catalyst comprises a polymeric binder in addition to the nitrogen-doped carbon nanotubes.

6. Process according to claim 5, wherein the polymeric binder is a sulphonated tetrafluoroethylene polymer.

7. Process according to claim 5 wherein the catalyst comprises fillers.

8. Process according to claim 1, wherein the catalyst comprises other catalytically active components in addition to the nitrogen-doped carbon nanotubes.

9. Process according to claim 1, carried out at a temperature of 0-200° C.

10. Process according to claim 1, operated at current densities of greater than 0.01 $kA/m^2$.

11. Process according to claim 1, wherein the aqueous chlorine- and/or chloride-containing solution is formed over the catalyst by passing a gas stream comprising molecular oxygen and gaseous HCl and also, optionally, water vapor over the catalyst.

12. Process according to claim 1, wherein the oxygen is reduced in the presence of a catalyst by application of an electric potential in a first reaction zone, with the catalyst comprising a proportion of nitrogen-doped carbon nanotubes as catalytically active component, and chloride is oxidized to chlorine in a second reaction zone.

* * * * *